(12) United States Patent
Rihn et al.

(10) Patent No.: US 9,842,476 B2
(45) Date of Patent: Dec. 12, 2017

(54) PROGRAMMABLE HAPTIC DEVICES AND METHODS FOR MODIFYING HAPTIC EFFECTS TO COMPENSATE FOR AUDIO-HAPTIC INTERFERENCE

(71) Applicant: Immersion Corporation, San Jose, CA (US)

(72) Inventors: William Rihn, San Jose, CA (US); David Birnbaum, Oakland, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 14/864,926

(22) Filed: Sep. 25, 2015

(65) Prior Publication Data

US 2017/0092084 A1   Mar. 30, 2017

(51) Int. Cl.
*H03G 3/00* (2006.01)
*G08B 6/00* (2006.01)
(Continued)

(52) U.S. Cl.
CPC ............... *G08B 6/00* (2013.01); *G06F 3/016* (2013.01); *G06F 3/033* (2013.01); *G06F 3/167* (2013.01);
(Continued)

(58) Field of Classification Search
CPC .......... A63F 13/02; A63F 13/08; A63F 13/25; A63F 2300/6063; A63F 13/28; G06F 3/016
(Continued)

(56) References Cited

U.S. PATENT DOCUMENTS 9,202,351 B2   12/2015   Levesque et al.
2009/0305744 A1   12/2009   Ullrich
(Continued)

FOREIGN PATENT DOCUMENTS

EP   2 821 912 A1   1/2015
EP   2 846 329 A1   3/2015

OTHER PUBLICATIONS

U.S. Appl. No. 14/739,002, filed Jun. 15, 2015, Cruz-Hernandez et al.
(Continued)

*Primary Examiner* — Disler Paul
(74) *Attorney, Agent, or Firm* — Medler Ferro Woodhouse & Mills PLLC

(57) ABSTRACT

A system includes a processor, an audio display, and a haptic peripheral including a haptic output device. The audio display includes a speaker and a headphone connector. The haptic output device is configured to receive a control signal from the processor and output a haptic effect to the haptic peripheral in response to the control signal from the processor. The processor is configured to vary the control signal for the haptic output device depending on an audio output accessory connectivity status of the audio display such that the haptic output device generates and applies a first haptic effect if the audio display is connected to an audio output accessory in order to output audio through the headphone connector and the haptic output device generates and applies a second haptic effect if the audio display is not connected to an audio output accessory in order to output audio through the speaker.

20 Claims, 11 Drawing Sheets

(51) Int. Cl.
    *G06F 3/16* (2006.01)
    *G06F 3/01* (2006.01)
    *G06F 3/033* (2013.01)
    *A63F 13/25* (2014.01)
    *A63F 13/28* (2014.01)

(52) U.S. Cl.
    CPC .............. *A63F 13/25* (2014.09); *A63F 13/28* (2014.09); *A63F 2300/6063* (2013.01)

(58) Field of Classification Search
    USPC ...... 381/104–109, 58–59, 61, 74; 463/34–35
    See application file for complete search history.

(56) References Cited

U.S. PATENT DOCUMENTS

| | | |
|---|---|---|
| 2014/0119569 A1 | 5/2014 | Peeler et al. |
| 2014/0274398 A1* | 9/2014 | Grant .................... G06F 3/0338 463/37 |
| 2014/0329589 A1* | 11/2014 | Hawver .................. A63F 13/42 463/29 |
| 2015/0251089 A1* | 9/2015 | Komori .................. A63F 13/28 463/35 |
| 2015/0323996 A1* | 11/2015 | Obana .................... G06F 3/016 345/177 |
| 2016/0057537 A1* | 2/2016 | Robinson ................. H04R 5/04 381/77 |

OTHER PUBLICATIONS

U.S. Appl. No. 14/855,471, filed Sep. 16, 2015, Cruz-Hernandez et al.
Extended European Search Report dated Feb. 1, 2017, issued in EP Application No. 16 18 8534.8.

\* cited by examiner

PROGRAMMABLE HAPTIC DEVICES AND METHODS FOR MODIFYING HAPTIC EFFECTS TO COMPENSATE FOR AUDIO-HAPTIC INTERFERENCE

FIELD OF THE INVENTION

Embodiments hereof relate to systems and methods for providing haptic effects or feedback.

BACKGROUND OF THE INVENTION

Video games and virtual reality systems have become even more popular due to the marketing toward, and resulting participation from, casual gamers. In a typical implementation, a computer system displays a visual or graphical environment to a user on a display device. Users can interact with the displayed environment by inputting commands or data from a controller or peripheral device. The computer updates the environment in response to the user's manipulation of a moved manipulandum such as a joystick handle and provides visual feedback to the user using the display screen.

Conventional video game devices or controllers use visual and auditory cues to provide feedback to a user. In some controller or peripheral devices, kinesthetic feedback (such as active and resistive haptic feedback) and/or tactile feedback (such as vibration, texture, and heat) is also provided to the user, more generally known collectively as "haptic feedback" or "haptic effects." Haptic feedback can provide cues that enhance and simplify the user controller or peripheral device. For example, vibration effects, or vibrotactile haptic effects, may be useful in providing cues to users of electronic devices to alert the user to specific events, or provide realistic feedback to create greater sensory immersion within a simulated or virtual environment. Conventional haptic feedback systems for gaming and other devices generally include an actuator for generating the haptic feedback attached to the housing of the controller/peripheral. More particularly, motors or other actuators of the controller or peripheral device are housed within the controller and are connected to the controlling computer system. The computer system receives sensor signals from the controller or peripheral device and sends appropriate haptic feedback control signals to the actuators. The actuators then provide haptic feedback to the controller. The computer system can thus convey physical sensations to the user in conjunction with other visual and auditory feedback.

There is a need for haptic feedback systems that provide variation of haptic effects not previously available to provide a more immersive and enjoyable experience for the user.

BRIEF SUMMARY OF THE INVENTION

Embodiments hereof relate to a system including a processor, an audio display, and a haptic peripheral. The audio display includes an audio output device. The haptic peripheral includes a haptic output device, wherein the haptic output device is configured to receive a control signal from the processor and output a haptic effect to the haptic peripheral in response to the control signal from the processor. The processor is configured to vary the control signal for the haptic output device depending on a detected status associated with interference between haptic and audio output devices such that the haptic output device generates and applies a first haptic effect if the detected status indicates a first state indicative of no or minimal interference between haptic and audio output devices and the haptic output device generates and applies a second haptic effect if the detected status indicates a second state indicative of interference between haptic and audio output devices. The first haptic effect is different than the second haptic effect.

Embodiments hereof also relate to a system including a processor, an audio display including a speaker and a headphone connector, and a haptic peripheral including a haptic output device. The haptic output device is configured to receive a control signal from the processor and output a haptic effect to the haptic peripheral in response to the control signal from the processor. The processor is configured to vary the control signal for the haptic output device depending on an audio output accessory connectivity status of the audio display such that the haptic output device generates and applies a first haptic effect if the audio display is connected to an audio output accessory in order to output audio through the headphone connector and the haptic output device generates and applies a second haptic effect if the audio display is not connected to an audio output accessory in order to output audio through the speaker. The first haptic effect is different than the second haptic effect.

Embodiments hereof also relate to a system including a processor, an audio display, and a haptic peripheral including a haptic output device. The audio display is configured to receive a control signal from the processor and output audio in response to the control signal from the processor. The haptic output device is configured to receive a control signal from the processor and output a haptic effect to the haptic peripheral in response to the control signal from the processor. The processor is configured to vary the control signal for the haptic output device or the control signal for the audio display depending on an audio output accessory connectivity status of the audio display.

BRIEF DESCRIPTION OF DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE INVENTION

Figure 1:
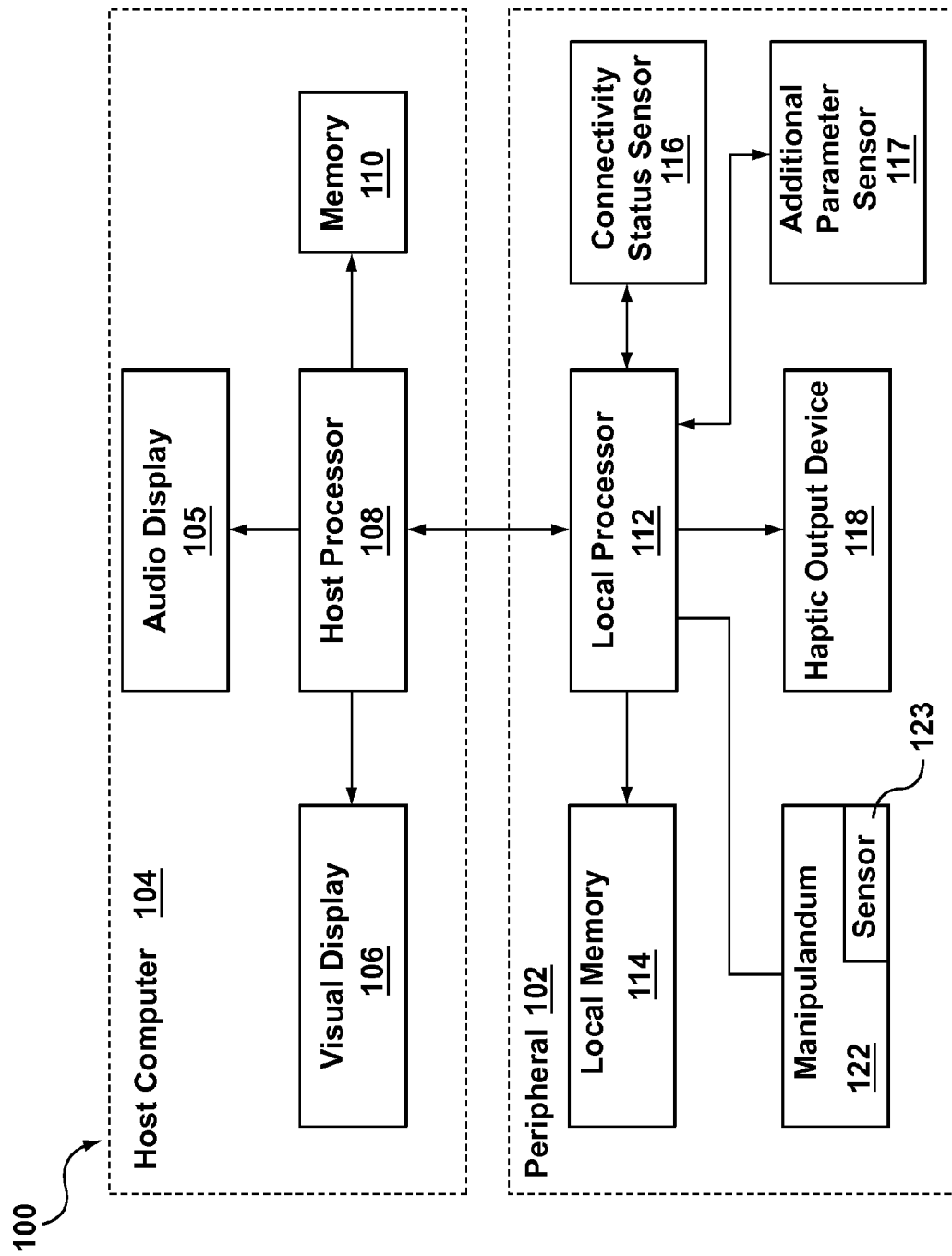
FIG. 1 is a block diagram of a system for providing haptic feedback to a haptic peripheral according to an embodiment hereof.

Specific embodiments of the present invention are now described with reference to the figures, wherein like reference numbers indicate identical or functionally similar elements. The following detailed description is merely exemplary in nature and is not intended to limit the invention or the application and uses of the invention. Furthermore, there is no intention to be bound by any expressed or implied theory presented in the preceding technical field, background, brief summary or the following detailed description. Furthermore, although the following description is primarily directed to gaming devices and controllers for gaming devices, those skilled in the art would recognize that the description applies equally to other virtual reality systems and peripherals for the virtual reality systems.

Embodiments hereof relate a system including a processor, an audio display, and a haptic peripheral including a haptic output device. The haptic peripheral includes a haptic output device, wherein the haptic output device is configured to receive a control signal from the processor and output a haptic effect to the haptic peripheral in response to the control signal from the processor. According to an embodiment hereof, which will be described in more detail herein with respect to the figures, the processor is configured to vary the control signal for the haptic output device depending on an audio output accessory connectivity status of the audio display. In some instances, audio and haptic outputs or effects may interfere with each other and thus in these instances it is desirable to vary or modify the audio and/or haptic outputs in order to minimize or prevent such interference. For example, audio-haptic interference may be an issue when certain haptic effects are output via integral speaker(s) of the audio display. In an embodiment hereof, if headphones or a Bluetooth device are connected to the audio display of the system and thus audio will be output via the connected audio output accessory device, the haptic output device generates and applies a first haptic effect. However, if no audio output accessory devices are connected to the audio display of the system and thus audio will be output via an integral speaker(s) of the audio display, the haptic output device generates and applies a second haptic effect which is different from the first haptic effect. In an embodiment, the first haptic effect is stronger (rendered if headphones or a Bluetooth device are connected to the audio display) than the second haptic effect (rendered if no audio output accessory devices are connected to the audio display) such that weaker effects are provided when audio is output via an integral speaker of the audio display as compared to stronger effects that are provided when audio is output via a connected audio output accessory device such as headphones or a Bluetooth device.

As used herein, the term "audio display" includes one or more components of the system that are capable of producing sound by outputting an audio or control signal. Stated another way, the audio display is configured to receive a control signal from a processor of the system and output audio in response to the control signal from the processor. The audio display may include one or more audio output devices or accessories such as but not limited to a speaker, headphones, a transducer, or the like. The audio output device or accessory may be integral to the system, or the audio output device or accessory may be a separate component that is selectively connected or otherwise coupled to the system. For example, the audio output device of the audio display may be one or more integral or built-in devices (i.e., an integral or built-in speaker of the system such as an integral speaker of a mobile phone or tablet computer) and/or may be one or more accessory devices that are selectively coupled to the system via an output or headphone connector of the audio display (i.e., a speaker or a headphone set that is coupled to mobile phone or tablet computer via an output or headphone connector of the audio display).

Figure 2:
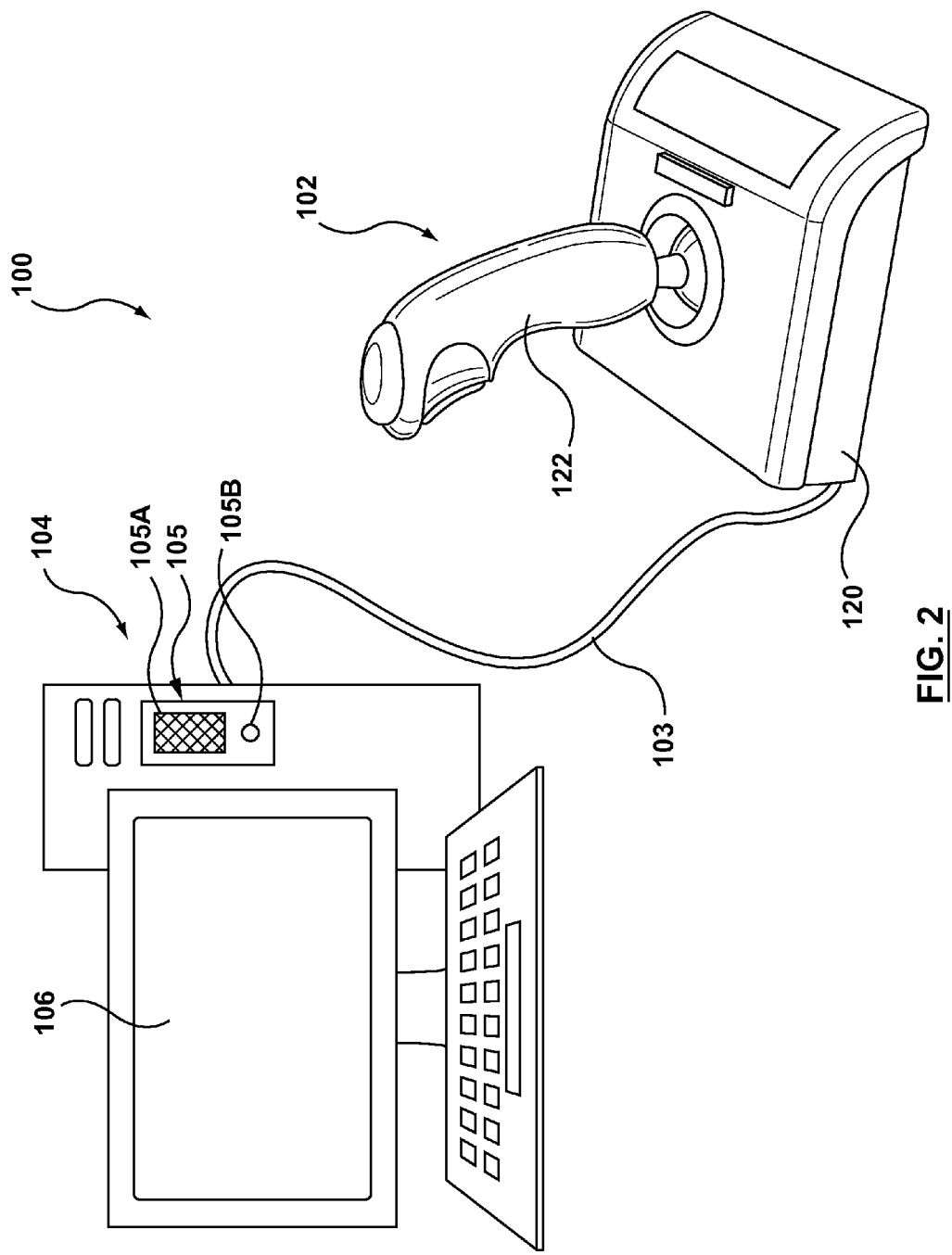
FIG. 2 is a schematic illustration of the system of FIG. 1, wherein the haptic peripheral is a haptic joystick.
Figure 4:
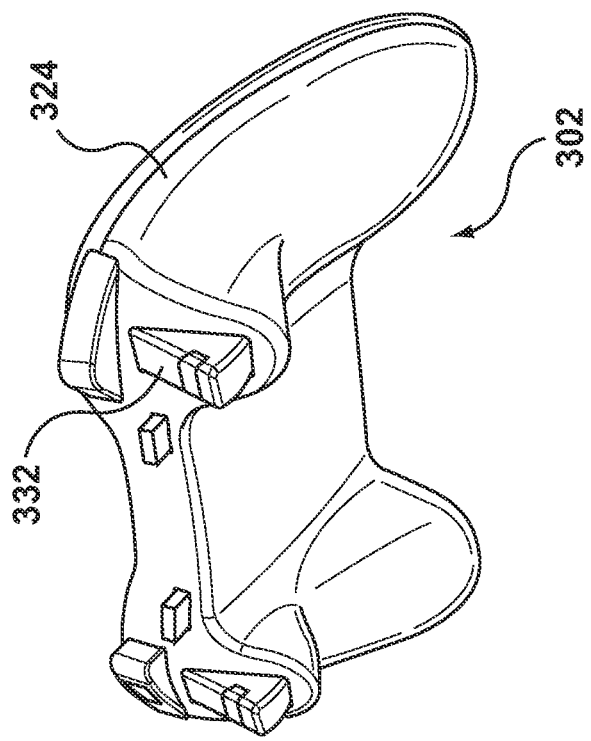
FIGS. 3 and 4 are perspective views of a haptic peripheral according to an embodiment hereof, wherein the haptic peripheral is a handheld gaming controller.
Figure 3:
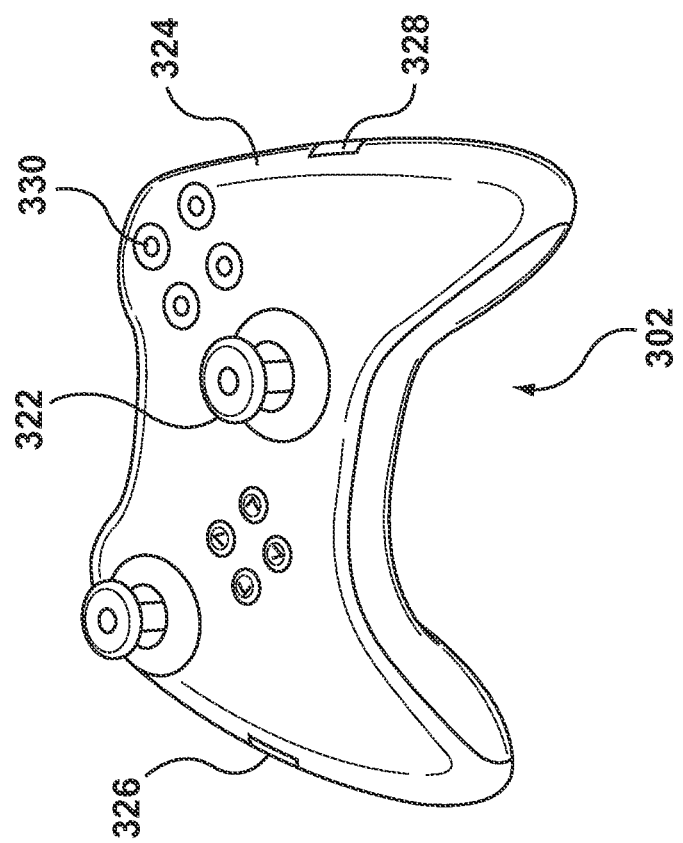
Figure 5:
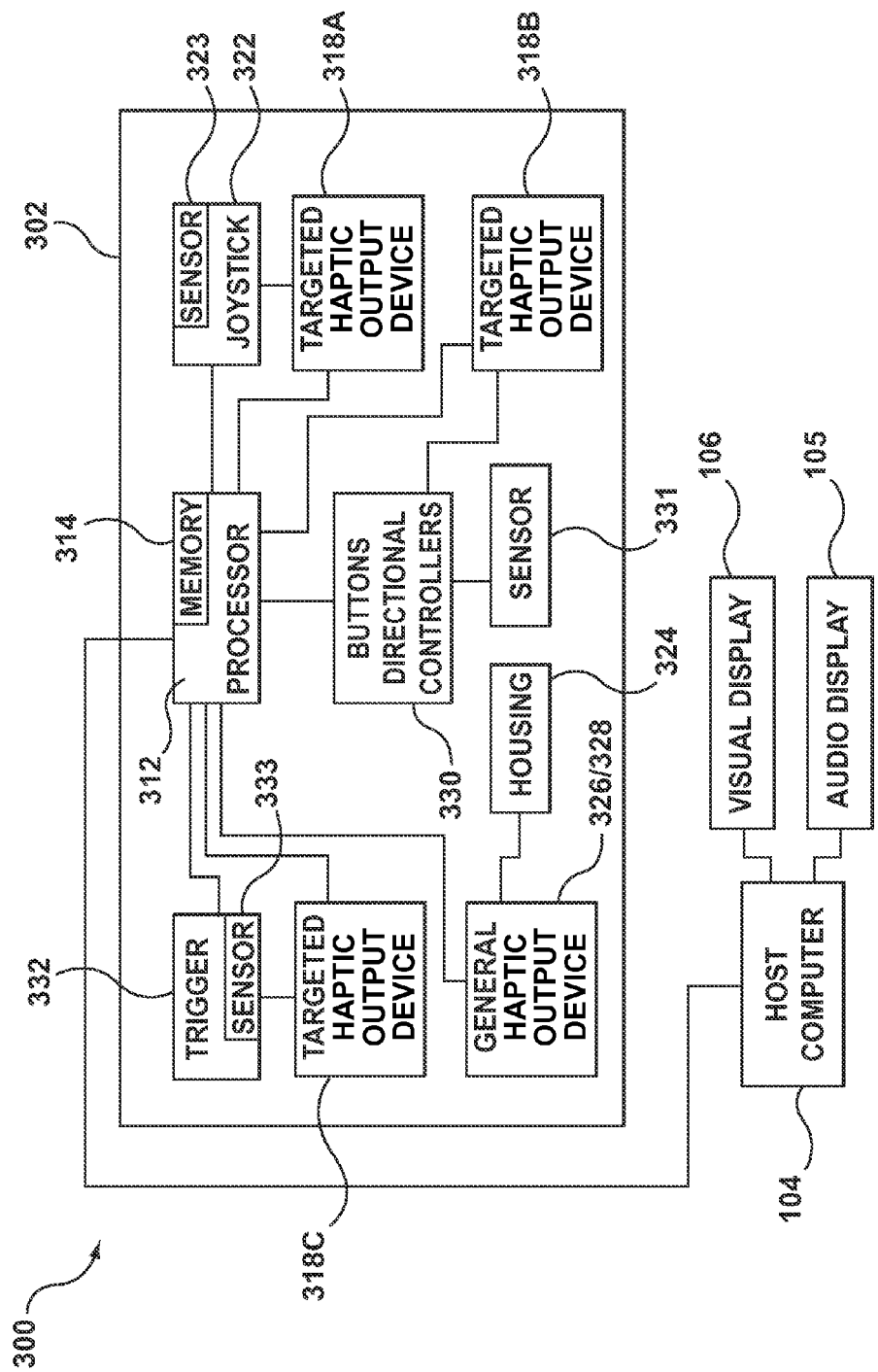
FIG. 5 illustrates a block diagram of the gaming controller of FIGS. 3 and 4.
Figure 6:
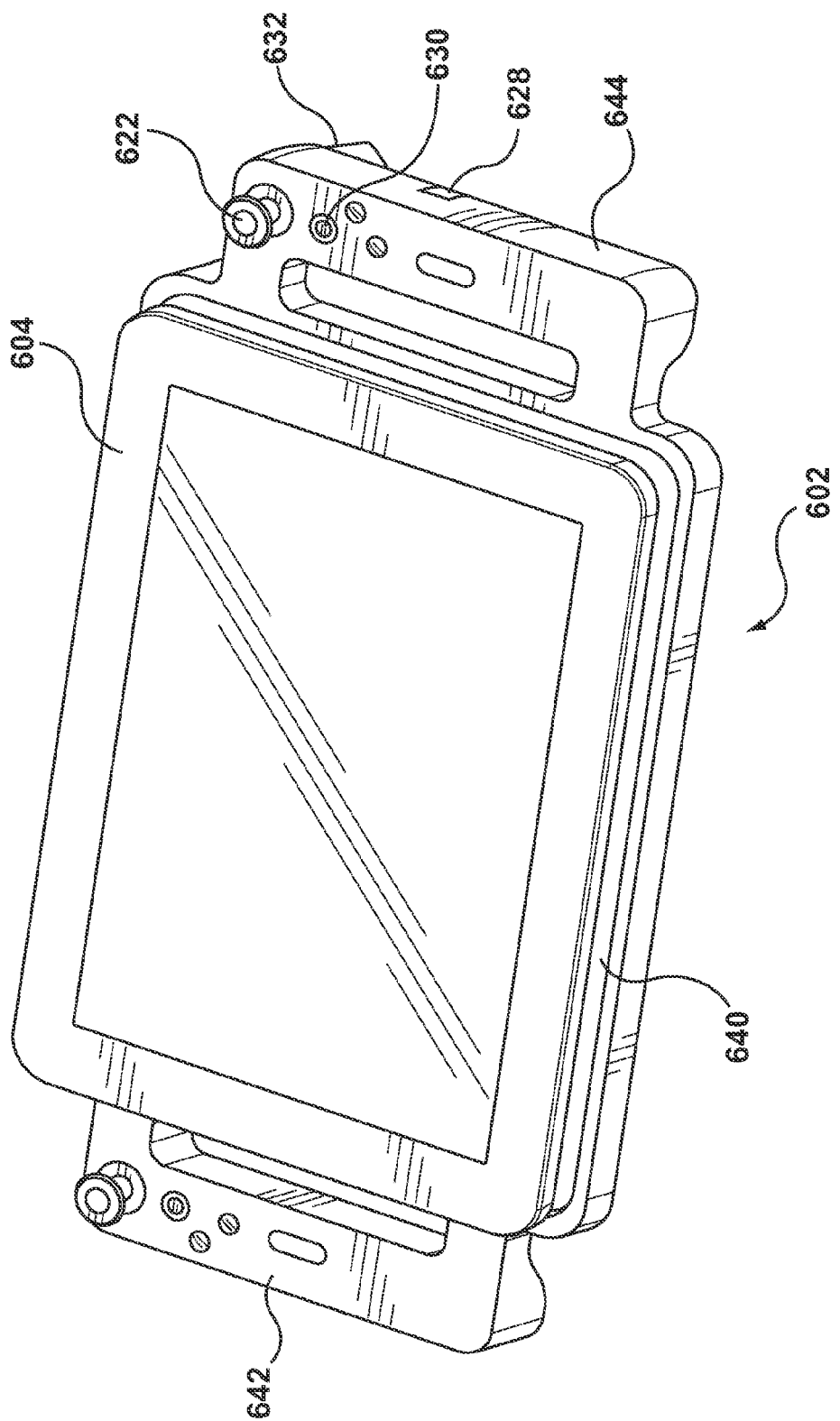
FIG. 6 is a perspective view of a system for providing haptic feedback to a haptic peripheral according to an embodiment hereof, wherein the haptic peripheral is a gaming tablet controller that may be used with a tablet computer.
Figure 7:
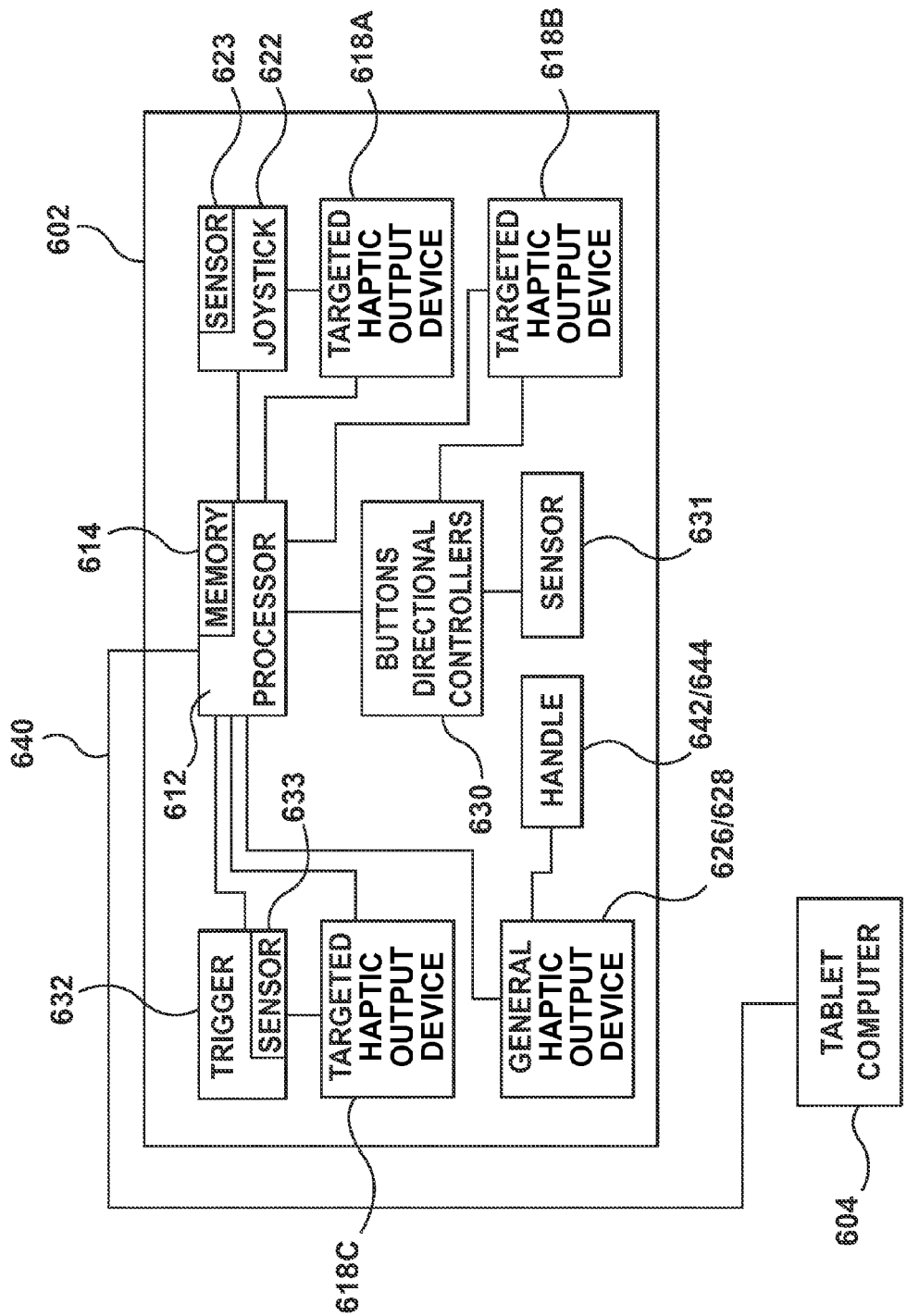
FIG. 7 illustrates a block diagram of the system of FIG. 6.

Varying or modifying haptic effects depending on an audio output accessory connectivity status may be utilized with various types of haptic peripherals, such as those shown in FIGS. 1-7. More particularly, FIG. 1 is a block diagram of a system 100 for providing haptic feedback to a haptic peripheral 102 according to an embodiment hereof and FIG. 2 is a schematic illustration of the system of FIG. 1. In the embodiment of FIGS. 1-2, haptic peripheral 102 is a haptic joystick with only a single manipulandum 122. However, those skilled in the art would recognize that the haptic joystick is merely an exemplary embodiment of a haptic peripheral and that haptic peripherals with other configurations, shapes, and sizes may be used. For example, as will be described in more detail herein, the haptic peripheral may be a handheld gaming controller 302 for a gaming system as shown in FIGS. 3-5 which is of similar shape and size to many "gamepads" currently available for video game console systems, a haptic peripheral 602 that may be used with a tablet computer 604 as shown in FIGS. 6-7, or other controllers that having user input (UI) elements such as, but not limited to, mobile phones, personal digital assistants (PDA), tablets, computers, gaming peripherals, and other controllers for virtual reality systems known to those skilled in the art.

With reference to the embodiment of FIGS. 1-2, haptic peripheral 102 is in communication with a host computer or computer system 104 that is configured to generate a virtual environment to a user on a video or visual display 106. Host computer 104 may include a video game console, mobile device, or any other type of computer system that contains a processor configured to generate a virtual environment to a user on a display. As shown in the block diagram of FIG. 2, host computer 104 includes a host processor 108, a memory 110, and visual display 106. Host computer 104 executes a software application that is stored in memory 110 and is executed by host processor 108. Host processor 108 may be any type of general purpose processor, or could be a processor specifically designed to provide haptic effect signals. Host processor 108 may be the same processor that operates the entire host computer 104, or may be a separate processor. Host processor 108 can decide what haptic effects to send to haptic peripheral 102 and in what order to send the haptic effects. Memory 110 may be any type of storage device or computer-readable medium, such as but not limited to random access memory (RAM) or read-only memory (ROM). Memory 110 may also be located internal to the host processor, or any combination of internal and external memory.

Host computer 104 is coupled to visual display 106 via wired or wireless means. Visual display 106 may be any type of medium that provides graphical information to a user; this includes but is not limited to monitors, television screens, plasmas, LCDs, projectors, or any other display devices. In an embodiment, host computer 104 is a gaming device console and visual display 106 is a monitor which is coupled to the gaming device console, as known in the art. In another embodiment, as known to those skilled in the art, host computer 104 and visual display 106 may be combined into a single device.

Host computer 104 also includes an audio display 105. In this embodiment, audio display 105 is integrated into host computer 104. Audio display 105 includes at least one built-in or integral speaker 105A and a headphone or output connector 105B configured to receive headphones therein. A user is thus able to plug headphones into host computer 104 via headphone connector 105B to hear the audio output, or audio may be output via integral speaker 105A. As used herein, "headphone connector" includes traditional headphone jacks as well as wireless headphone connectors or adapters such as but not limited to Bluetooth and the like configured to wirelessly connect a pair of headphones to a system. Although described as integral, it will be obvious to one of ordinary skill in the art that speaker 105A may be a separate component coupled to host computer 104 and/or speaker 105A may be coupled to a different component of system 100. Further, as explained in more detail herein, in embodiments hereof the audio display may be integrated into various components of the system such as the host computer, the haptic peripheral, or a secondary peripheral such as the visual display.

In the embodiment shown in FIGS. 1-2, host computer 104 is in communication with haptic peripheral 102 through a wired or USB connection 103. However, in other embodiments, haptic peripheral 102 may communicate with host computer 104 using other wired communication or wireless communication means known to those of skill in the art. This can include but is not limited to a serial or Bluetooth connection. Further, host computer 104 may be in the cloud and thus is not required to be wired or connected wirelessly in a local fashion.

As best shown in FIG. 2, haptic peripheral 102 includes a housing or base 120 and manipulandum or user input device 122 which can move in one or more degrees of freedom. Manipulandum 122 extends from housing 120. Although FIG. 2 illustrates a joystick as the manipulandum of the haptic peripheral, it will be understood by one of ordinary skill in the art that the present disclosure is not limited to a joystick manipulandum, but also includes any devices moveable in, either in whole or in part, one or more degrees of freedom. Those skilled in the art would recognize that the joystick is merely an exemplary embodiment of a manipulandum of a controller, and that manipulandums with other configurations such as triggers, buttons, or other user input elements may be used as will be described in more detail herein.

With additional reference to FIG. 1, haptic peripheral 102 includes a local processor 112, a local memory 114, a manipulandum sensor 123, and at least one haptic output device 118. Haptic peripheral 102 may also include a connectivity sensor 116 and an additional parameter sensor 117, although such sensors are not required in all embodiments as will be described in more detail herein. Haptic peripheral 102 may be alternatively configured to not include local processor 112, whereby all input/output signals from haptic peripheral 102 are handled and processed directly by host computer 104. As will be explained in more detail herein, local processor 112 is coupled to haptic output device 118 to provide haptic effects thereto based on high level supervisory or streaming commands from host computer 104. Similar to host processor 108, local processor 112 also can decide what haptic effects to send and what order to send the haptic effects. In addition, if haptic peripheral 102 includes more than one haptic output device, local processor 112 can decide which haptic output device will receive the haptic effect signal. In addition, similar to memory 110 of host computer 104, local memory 114 that can be any type of storage device or computer-readable medium, such as but not limited to random access memory (RAM) or read-only memory (ROM). Local memory 114 may also be located internal to the local processor, or any combination of internal and external memory.

As stated above, manipulandum 122 of haptic peripheral 102 may be physically moved within one or more degrees of freedom. For example, a user may move the manipulandum 122 forward, backwards, left or right. When a user moves manipulandum 122, manipulandum sensor 123 detects the movement and/or position of the manipulandum and transmits a sensor signal to local processor 112. Local processor 112 then communicates or transmits the sensor signal to host computer 104. Based on the received sensor signal, host computer 104 performs actions within the video game and updates the virtual environment. Stated another way, the movement of manipulandum 122 of haptic peripheral 102 represents inputs from the user which allows the user to interact with the software applications running on host computer 104, including but not limited to video games relating to first person shooter, third person character interaction, vehicle related games, or computer simulations. The movement of manipulandum 122 may provide host computer 104 with input corresponding to the movement of a computer generated graphical object, such as a cursor or other image, or some other graphical object displayed by the host computer 104 via visual display 106, or to control a virtual character or gaming avatar, such as a person, vehicle, or some other entity that may be found in a game or computer simulation.

In addition to receiving sensor signals from manipulandum sensor 123, local processor 112 also receives high level supervisory or streaming commands from host computer 104 relating to haptic effects to be output from haptic output device 118. Local processor 112 then provides control or drive signals to haptic output device 118 based on the high level supervisory or streaming commands from host computer 104. For example, when in operation, voltage magnitudes and durations are streamed from host computer 104 to haptic peripheral 102 where information is provided to haptic output device 118 via local processor 112. Host computer 104 may provide high level commands to local processor 112 such as the type of haptic effect to be output (e.g. vibration, jolt, detent, pop, etc.) by haptic output device 118, whereby the local processor 112 instructs haptic output device 118 as to particular characteristics of the haptic effect which is to be output (e.g. magnitude, frequency, duration, etc.). Local processor 112 may retrieve the type, magnitude, frequency, duration, or other characteristics of the haptic effect from local memory 114 coupled thereto. Depending on game actions and control signals received from host computer 104, local processor 112 may send a control or drive signal to haptic output device 118 to output one of a wide variety of haptic effects or sensations, including vibrations, detents, textures, jolts or pops.

Haptic output device 118 may be an inertial or kinesthetic actuator as known to those of ordinary skill in the art of virtual reality systems. Possible actuators include but are not limited to eccentric rotating mass ("ERM") actuators in which an eccentric mass is moved by a motor, linear resonant actuators ("LRAs") in which a mass attached to a spring is driven back and forth, piezoelectric actuators, electromagnetic motors in which an eccentric mass is moved by a motor, vibrotactile actuators, inertial actuators, shape memory alloys, electro-active polymers that deform in response to signals, mechanisms for changing stiffness, electrostatic friction (ESF), ultrasonic surface friction (USF), or any combination of actuators described above. In another embodiment, the actuator may use kinesthetic haptic feedback including, for example, solenoids to change the stiffness/damping of manipulandum 122 and/or housing 120, small air bags that change size in manipulandum 122 and/or housing 120, or shape changing materials.

As previously stated, haptic peripheral 102 is merely an exemplary embodiment of a haptic peripheral and that haptic peripherals with other configurations, shapes, and sizes may be used. For example, FIGS. 3-5 illustrate another embodiment of a haptic peripheral 302 that may be utilized in embodiments hereof. FIGS. 3 and 4 are different perspective views of haptic peripheral 302, wherein the haptic peripheral is a handheld gaming controller, while FIG. 5 illustrates a block diagram of haptic peripheral 302 used in a gaming system 300 that further includes host computer 104, audio display 105, and visual display 106. A housing 324 of haptic peripheral 302 is shaped to easily accommodate two hands gripping the device, either by a left-handed user or a right-handed user. Those skilled in the art would recognize that haptic peripheral 302 is merely an exemplary embodiment of a controller of similar shape and size to many "gamepads" currently available for video game console systems, and that controllers with other configurations of user input elements, shapes, and sizes may be used, including but not limited to controllers such as a Wii™ remote or Wii™ U Controller, Sony® SixAxis™controller or Sony® Wand controller, an Xbox™ controller or similar controller, as well as controllers shaped as real life objects (such as tennis rackets, golf clubs, baseball bats, and the like) and other shapes.

Haptic peripheral 302 includes several user input elements or manipulandums, including a joystick 322, a button 330, and a trigger 332. As used herein, user input element refers to an interface device such as a trigger, button, joystick, or the like, which is manipulated by the user to interact with host computer 104. As can be seen in FIGS. 3-4 and known to those skilled in the art, more than one of each user input element and additional user input elements may be included on haptic peripheral 302. Accordingly, the present description of a trigger 332, for example, does not limit haptic peripheral 302 to a single trigger. Further, the block diagram of FIG. 5 shows only one (1) of each of joystick 322, button 330, and trigger 332. However, those skilled in the art would understand that multiple joysticks, buttons, and triggers, as well as other user input elements, may be used, as described above.

As can be seen in the block diagram of FIG. 5, haptic peripheral 302 includes a targeted haptic output device or motor to directly drive each of the user input elements thereof as well as one or more general or rumble haptic output devices 326, 328 coupled to housing 324 in a location where a hand of the user is generally located. More particularly, joystick 322 includes a targeted haptic output device or motor 318A coupled thereto, button 330 includes a targeted haptic output device or motor 318B coupled thereto, and trigger 332 includes a targeted haptic output device or motor 318C coupled thereto. In addition to a plurality of targeted haptic output devices, haptic peripheral 302 includes a position sensor coupled to each of the user input elements thereof. More particularly, joystick 322 includes a position sensor 323 coupled thereto, button 330 includes a position sensor 331 coupled thereto, and trigger 332 includes a position sensor 333 coupled thereto. Local processor 312 is coupled to targeted haptic output devices 318A, 318B, 318C as well as position sensors 323, 331, 333 of joystick 322, button 330, and trigger 332, respectively. In response to signals received from position sensors 323, 331, 333, local processor 312 instructs targeted haptic output devices 318A, 318B, 318C to provide directed or targeted effects directly to joystick 322, button 330, and trigger 332, respectively. Such targeted effects are discernible or distinguishable from general or rumble haptic effects produced by general haptic output devices 326, 328 along the entire body of the controller. The collective haptic effects provide the user with a greater sense of immersion to the game as multiple modalities are being simultaneously engaged, e.g., video, audio, and haptics. Similar to haptic peripheral 102 and host computer 104, haptic peripheral 302 is coupled to and communicates with host computer 104 having audio display 105 and visual display 106. Local processor 312 of haptic peripheral 302 is coupled to each haptic output device to provide haptic effects thereto based on high level supervisory or streaming commands from host computer 104. The haptic output devices of haptic peripheral 302 may be any type of haptic output device listed herein for haptic output device 118 of haptic peripheral 102. Haptic peripheral 302 may also include a connectivity sensor (not shown) similar to connectivity sensor 116, and/or an additional parameter sensor (not shown) similar to additional parameter sensor 117, although sensors are not required in all embodiments as will be described in more detail herein.

FIGS. 6-7 illustrate a haptic peripheral 602 according to another embodiment hereof in which haptic peripheral 602 is a gaming tablet controller that may be used with a tablet computer 604, which includes integrated visual and audio displays as will be understood by one of ordinary skill in the art. Tablet computer 604 may be designed specifically for gaming activities, such as is available from Razer Inc., or may be a tablet computer well known and available in the market, such as an Apple® Ipad®, Kindle® Fire®, and Samsung® Galaxy Tab®. Haptic peripheral 602 includes a docking portion 640 configured to receive tablet computer 604 and handles 642, 644 with manipulandums disposed thereon for a user to control a game on tablet computer 604. Docking portion 640 connects haptic peripheral 602 to tablet computer 604 such that actions by the user on handles 642, 644, such as pressing buttons, moving joysticks, pressing triggers, etc., result in actions on the game being played on tablet computer 604.

Handles 642, 644 include typical manipulandums or user input elements found on controllers. The manipulandums will be described with respect to handle 644. However, those skilled in the art would recognize that the same or similar manipulandums may be used on handle 642. In particular, handle 644 includes a joystick 622, a button 630, and a trigger 632. As can be seen in FIG. 6 and known to those skilled in the art, more than one of each of these user input elements may be included on each handle 642, 644. Further, handles 642, 644 include general or rumble haptic output devices 626, 628 attached thereto in a location where hands of the user are generally located for providing general or rumble haptic effects to handles 642, 644 as described above with respect to general or rumble haptic output devices 326, 328.

As shown in the block diagram of FIG. 7, haptic peripheral 602 includes a local processor 612 which communicates with tablet computer 604 via docking portion 640. The block diagram of FIG. 7 shows only one (1) of each of joystick 622, button 630, and trigger 632. However, those skilled in the art would understand that multiple joysticks, buttons, and triggers, as well as other user input elements, may be used, as described above. Local processor 612 is coupled to targeted haptic output devices 618A, 618B, 618C as well as position sensors 623, 631, 633 of joystick 622, button 630, and trigger 632, respectively. In response to signals received from position sensors 623, 631, 633, local processor 612 instructs targeted haptic output devices 618A, 618B, 618C to provide directed or targeted effects directly to joystick 622, button 630, and trigger 632, respectively. Local processor 612 of haptic peripheral 602 is coupled to each haptic output device to provide haptic effects thereto based on high level supervisory or streaming commands from host computer 604. The haptic output devices of haptic peripheral 602 may be any type of haptic output device listed herein for haptic output device 118 of haptic peripheral 102. Haptic peripheral 602 may also include a connectivity sensor (not shown) similar to connectivity sensor 116, and/or an additional parameter sensor (not shown) similar to additional parameter sensor 117, although sensors are not required in all embodiments as will be described in more detail herein.

Although FIGS. 6-7 illustrate haptic peripheral 602 as a gaming tablet controller that may be used with a tablet computer 604, it will be understood by one of ordinary skill in the art that the haptic peripheral and the host or tablet computer may be within the same device or housing. Stated another way, the gaming tablet controller may be a gaming tablet that does not have an associated peripheral but rather the haptic output device and the audio display are integrated into the gaming tablet itself as a single device.

Regardless of which haptic peripheral configuration or embodiment is utilized, the host processor and/or the local processor of the system is configured to vary the control signal for the haptic output device depending on an audio output accessory connectivity status of the audio display. Stated another way, the host processor and/or the local processor of the system is configured to vary or modify the control signal for the haptic output device depending whether or not the audio display of the system is connected to an audio output accessory such as headphones or a Bluetooth device. For example, weaker haptic effects are played or output when no audio output accessory devices are connected to the audio display and audio is output via an integral speaker of the audio display while stronger haptic effects are played or output when an audio output accessory device is connected to the audio display and audio is output via the connected audio output accessory device. As previously stated herein, in some instances, audio and haptic outputs or effects may interfere with each other and thus in these instances it is desirable to vary or modify the audio and/or haptic outputs in order to minimize or prevent such interference. As another example, certain sound or audio effects are audible on headphones that do not come through on mobile phone speakers and thus in these instances it is desirable to avoid haptic effects with sounds that are not audible to the viewer when sound is being output via the mobile phone speakers. Detecting the presence of connected headphones, or lack thereof, allows the selection of a tactile track or haptic effects that takes these considerations into account. As will be described in more detail herein, embodiments hereof compensate for the differences in content aesthetic when viewing a video with or without headphones, compensate for speaker-haptic interference, and take different hardware or device specific issues or capabilities into account.

In any embodiment hereof, the audio output accessory device may be connected to any component of the system. More particularly, the audio output accessory device is connected to the audio display and as described herein, the audio display may be integrated into the host computer, the haptic peripheral, or a secondary peripheral such as the visual display, and as such. Thus, connection of the audio output accessory device depends upon which system component the audio display is integrated into. For example, in an embodiment, the audio output accessory device is connected to the host computer. More particularly, in this example, the audio display is part of or integrated into the host computer such as but not limited to a PC. A user is thus able to plug headphones into the host computer to hear the audio output, and also a user can plug the haptic peripheral into the host computer as well for control of the game. In another embodiment, the audio output accessory device is connected to the haptic peripheral. More particularly, in this example, the audio display is part of or integrated into the same peripheral as the haptic display, e.g., a game controller with an audio jack and integrated or built-in speaker(s). In another embodiment, the audio output accessory device is connected to a peripheral display device or interface such as the visual display device which also provides audio connectivity. More particularly, in this example, the audio display is part of or integrated into a secondary peripheral such as a computer monitor with audio features or an external amplifier. A user is thus able to plug headphones into the secondary peripheral to hear the audio output, and also a user can plug the haptic peripheral into the host computer as well for control of the game. In any embodiment hereof, haptic effects output by the haptic peripheral are modified based on what the user is hearing, either in headphones or through a speaker.

Figure 8:
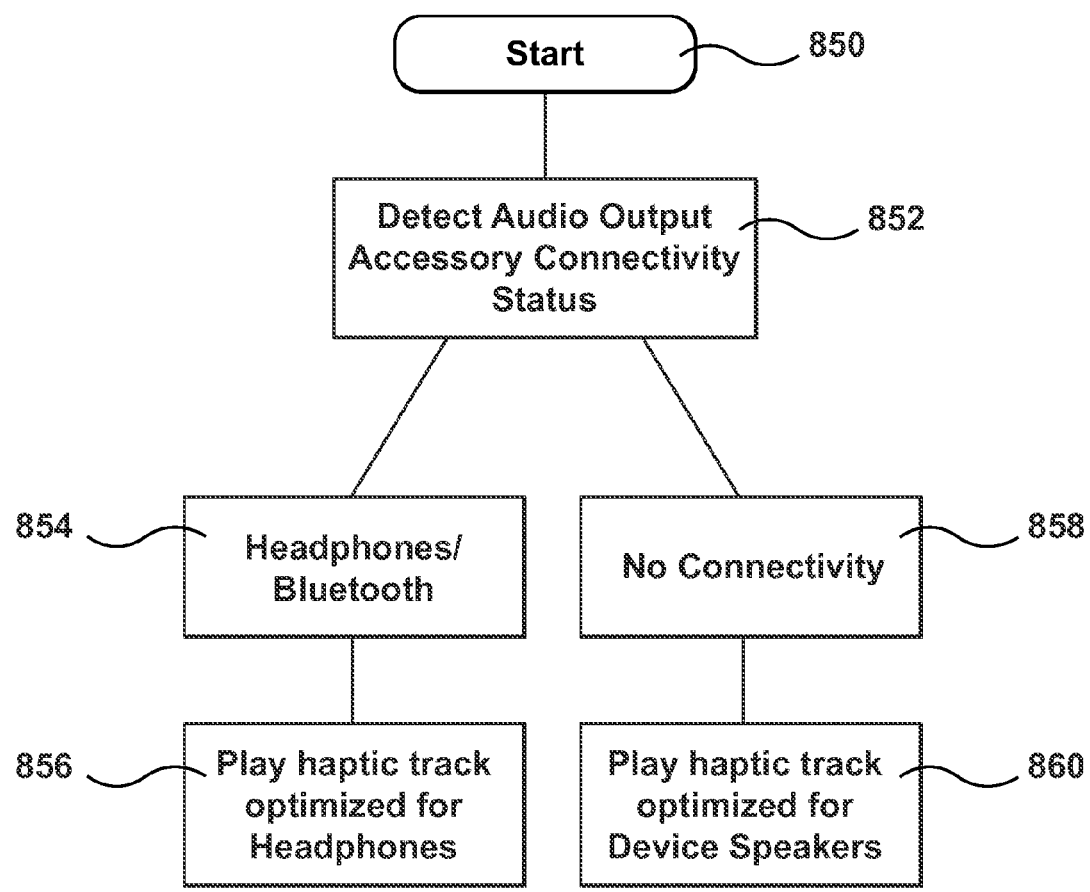
FIG. 8 is a flow chart illustrating a method for providing haptic effects to a user of a haptic peripheral according to an embodiment hereof, wherein the rendered haptic effects vary depending upon an audio output accessory connectivity status.

More particularly, FIG. 8 is a flow chart that illustrates a method for providing haptic effects to a user of a haptic peripheral according to an embodiment hereof. Step 850 indicates the start or beginning of the method. In the embodiment of FIG. 8, the rendered haptic effects vary depending upon an audio output accessory connectivity status of the audio display. In an embodiment, the functionality of the flow diagram of FIG. 8 is implemented by software stored in the host memory of the host component and executed by the host processor, and/or the local memory of the haptic peripheral and executed by the local processor. In other embodiments, the functionality may be performed by hardware through the use of an application specific integrated circuit ("ASIC"), a programmable gate array ("PGA"), a field programmable gate array ("FPGA"), or any combination of hardware and software. In this embodiment, an audio display of the system includes at least an integral speaker and a headphone connector configured to receive headphones therein. The audio display may be integrated into the host computer, the haptic peripheral, or a secondary peripheral such as the visual display. It will be understood by one of ordinary skill in the art that the method of FIG. 8 may be performed by haptic peripheral 102, haptic peripheral 302, haptic peripheral 602, or a haptic peripheral having another configuration as known in the video gaming art.

In step 852, an audio output accessory connectivity status is detected. As used herein, audio output accessory includes headphones, a Bluetooth device such as headphones or an external speaker, or other accessory device which may be connected to the audio display for outputting audio or sound. Connectivity status as used herein refers to whether an audio output accessory is connected to the audio display for outputting audio or sound. If an audio output accessory is not connected to the audio display, an integral speaker of the audio display is utilized for outputting audio or sound. The audio output accessory connectivity status of the audio display may be detected in one of several ways. In certain embodiments hereof, the audio output accessory connectivity status of the audio display may be detected via connectivity sensor 116 (see FIG. 1). Examples for connectivity sensor 116 in this embodiment include but are not limited to hardware sensors such as light dependent resistors (LDRs), mechanical switches, and capacitive sensors, and also software sensors wherein the system determines whether an electrical connection has been made. In other embodiments hereof, the host processor and/or the local processor is configured to detect the audio output accessory connectivity status without the use of connectivity sensor 116 (and thus additional connectivity sensor 116 is not required in this embodiment). For example, a processor of a haptic peripheral such as a tablet computer or mobile phone may be programmed or configured to detect or determine whether an audio output accessory is connected thereto.

Once it is determined whether the audio display is connected to an audio output accessory, the host processor and/or the local processor is configured to vary the control signal for the haptic output device depending on the audio output accessory connectivity status of the audio display. If the audio display is connected to headphones or a Bluetooth device as shown in step 854, the haptic output device is instructed to play or output a haptic track or effects that are optimized for headphones or a Bluetooth device as shown in step 856. If the audio display is not connected to an audio output accessory (i.e., if the audio display is not connected to headphones or a Bluetooth device) as shown in step 858, the haptic output device is instructed to play or output a haptic track or effects that are optimized for the device speakers as shown in step 860. Stated another way, if headphones or a Bluetooth device are connected to the audio display (and thus audio will be output via the connected audio accessory device), the haptic output device generates and applies a first haptic effect at step 856. However, if no audio accessory devices are connected to the audio display (and thus audio will be output via an integral speaker of the audio display), the haptic output device generates and applies a second haptic effect at step 860. In an embodiment, the first haptic effect is stronger than the second haptic effect such that weaker effects are provided when audio is output via an integral speaker of the audio display as compared to stronger effects that are provided when audio is output via a connected audio accessory device such as headphones or a Bluetooth device.

As used herein, varying the control signal for the haptic output device may include outputting or selecting a track of haptic effects according to the detected audio output accessory connectivity status of the audio display or may include modifying or changing the haptic effects of a track according to the detected audio output accessory connectivity status of the audio display. Stated another way, depending on detected audio output accessory connectivity status, the host processor and/or the local processor may be configured to adjust the haptic effects of a predetermined haptic track or may be configured to select which haptic track is to be played or output.

More particularly, in an embodiment, the host processor and/or the local processor may be configured to enable or select a haptic track with stronger or additional effects for headphones or Bluetooth speakers and configured to enable or select a track with weaker or fewer effects for when playing out of integral speakers of the audio display. For example, the host processor accesses a pre-defined mapping of change of state and haptic effects. The host processor may determine that the change of state exists (i.e., an audio output accessory is plugged into the headphone connector or otherwise connected to the audio display) and that the associated haptic effect is to strengthen haptic effects and/or to provide additional haptic effects. The associated haptic effects for this change of state may be determined according to a pre-defined mapping system employed by the host processor and/or the local processor. For example, the pre-defined mapping system may dictate that a particular content track or sequence of authored haptic effects be played when it is detected that an audio output accessory is connected to the audio display.

In another embodiment, the host processor and/or the local processor may be configured to modify a predetermined haptic track to cancel or leave out particular haptic effects thereof when no audio output accessory is detected and thus both audio and haptic effects are being output from integral speakers of the audio display. For example, the pre-defined mapping system may dictate that a currently playing content track or sequence of authored haptic effects be modified or varied depending upon the connection status. The haptic effects being output according to the currently playing content track may gradually strengthen or strengthen to a predetermined level for a predetermined amount of time when it is detected that an audio output accessory is connected to the audio display. As such, the haptic volume or strength is increased or haptic effects such as texture may be added when the audio display is connected to an audio output accessory. It will be apparent to one of ordinary skill in the art that the above examples of pre-defined mapping systems are exemplary in nature and any pre-defined mapping system may be utilized as desired by the developer of the virtual environment.

The haptic effects that are output by the haptic output device can include but are not limited to varying degrees of vibrations, varying degrees of detents, or other types of haptic effects. As an illustrative example, if a user is controlling a character or some other graphical object and then encounters an explosion in the virtual environment, the associated haptic effect might be a vibration. In this case, the local processor receives a signal indicating that haptic peripheral should vibrate with a strength that varies depending on the detected audio output accessory connectivity status of the audio display. As a result, the local processor sends the signal to the haptic output device to provide the appropriate haptic effect, which in this example is a vibration with a particular strength that depends on whether or not an audio display is connected to an audio output accessory. In determining the type of haptic effects to be executed and provided to the user, high level haptic parameters or streaming values are generated in the software code and sent to a haptic engine (not shown) where they are processed and the appropriate voltage levels are generated for the haptic output devices. This allows the haptic peripheral to provide the appropriate haptic feedback to the user and vary the amount or type of haptic feedback through the different voltage levels that are generated for the haptic output devices. In addition, the gaming software and the haptic software can reside on the same processor or on multiple processors.

Although FIG. 8 illustrates only two options for optimized haptic effects (i.e., whether or not an audio output accessory is connected to the audio display), it will be understood by one of ordinary skill in the art that such the optimized haptic effects may further vary depending upon the type of audio output accessory. Stated another way, the haptic effects may differ depending upon which type of audio output accessory is connected to the audio display. For example, a first optimized track or haptic effect may be played if the audio display is connected to earbud headphones, a different optimized track or haptic effect may be played if the audio display is connected to over-the-ear headphones, and yet another different optimized track or haptic effect may be played if the audio display is connected to an external speaker. Thus, different haptic effects may be provided based on sensing what audio output component or accessory is being used.

In another embodiment hereof, the rendered haptic effects may vary depending upon a detected device setting as well as upon the audio output accessory connectivity status of the audio display. Device settings may include but are not limited to a volume level as described with respect to FIG. 9 or a power status as described with respect to FIG. 10. Thus, different haptic effects may be provided based on sensing what audio output component or accessory is being used and how it is being used.

Figure 9:
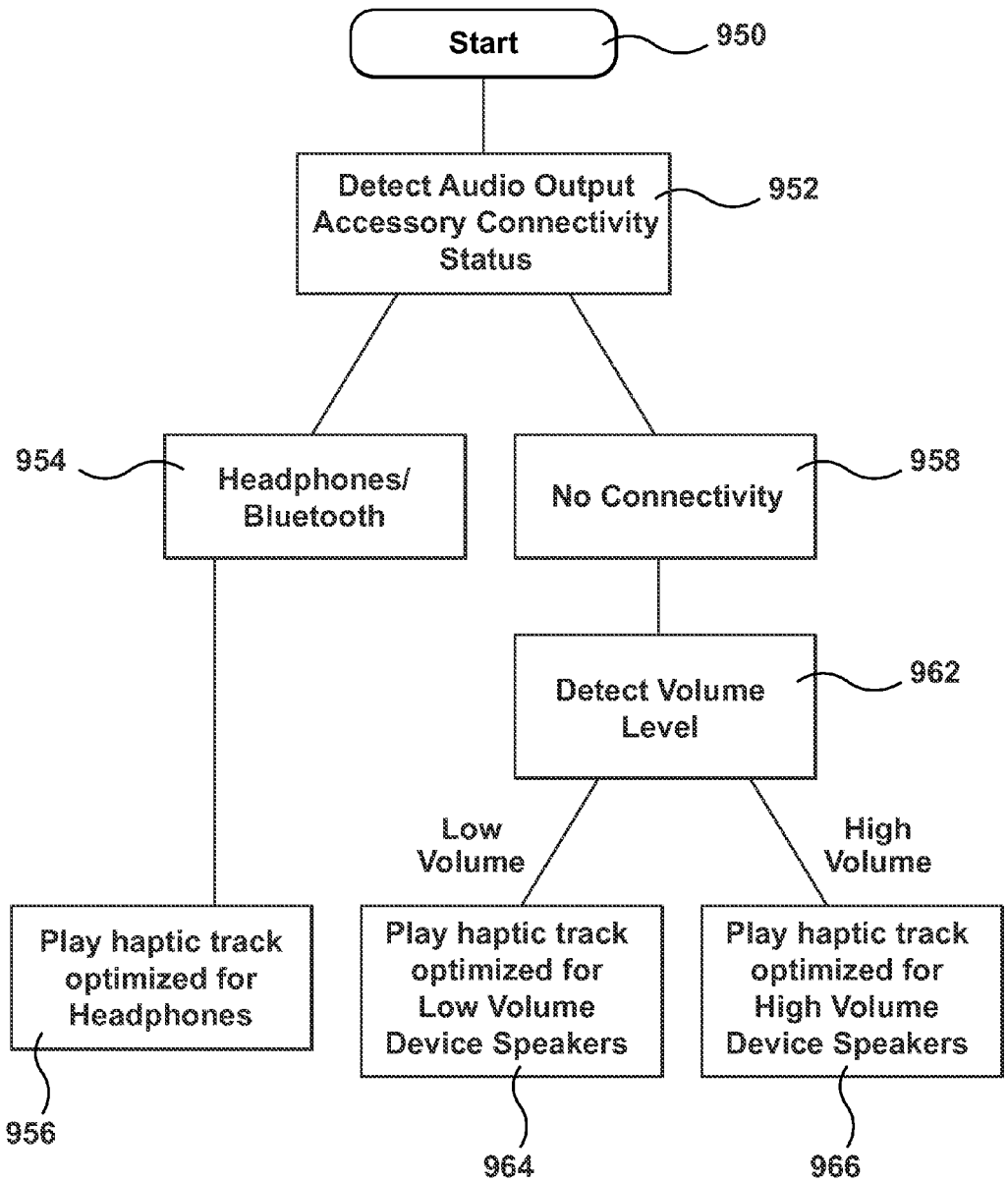
FIG. 9 is a flow chart illustrating a method for providing haptic effects to a user of a haptic peripheral according to an embodiment hereof, wherein the rendered haptic effects vary depending upon an audio output accessory connectivity status of an audio display and upon a detected setting of the audio display, the detected setting being a volume level.

More particularly, FIG. 9 is a flow chart illustrating a method for providing haptic effects to a user of a haptic peripheral according to an embodiment hereof, wherein the rendered haptic effects vary depending upon an audio output accessory connectivity status of the audio display and upon a detected setting of the audio display, the detected setting being a volume level. Step 950 indicates the start or beginning of the method. In an embodiment, the functionality of the flow diagram of FIG. 9 is implemented by software stored in the host memory of the host component and executed by the host processor, and/or the local memory of the haptic peripheral and executed by the local processor. In other embodiments, the functionality may be performed by hardware through the use of an application specific integrated circuit ("ASIC"), a programmable gate array ("PGA"), a field programmable gate array ("FPGA"), or any combination of hardware and software. In this embodiment, an audio display of the system includes at least an integral speaker and a headphone connector configured to receive headphones therein. The audio display may be integrated into the host computer, the haptic peripheral, or a secondary peripheral such as the visual display. It will be understood by one of ordinary skill in the art that the method of FIG. 9 may be performed by haptic peripheral 102, haptic peripheral 302, haptic peripheral 602, or a haptic peripheral having another configuration as known in the video gaming art.

In step 952, an audio output accessory connectivity status of the audio display is detected. If an audio output accessory is not connected to the audio display, an integral speaker of the audio display is utilized for outputting audio or sound. As described above with respect to FIG. 8, the audio output accessory connectivity status of the audio display may be detected in one of several ways such as via connectivity sensor 116 or the host processor and/or the local processor is configured to detect the audio output accessory connectivity status of the audio display without the use of connectivity sensor 116.

Once it is determined whether the audio display connected to an audio output accessory, the host processor and/or the local processor is configured to vary the control signal for the haptic output device depending on the audio output accessory connectivity status of the audio display and the volume level of the audio display. If the audio display is connected to headphones or a Bluetooth device as shown in step 954, the haptic output device is instructed to play or output a haptic track or effects that are optimized for headphones or a Bluetooth device as shown in step 956. If the audio display is not connected to an audio output accessory (i.e., if the audio display is not connected to headphones or a Bluetooth device) as shown in step 958, a volume level of the haptic peripheral is detected at step 962. In an embodiment hereof, the host processor and/or the local processor is configured to detect the volume level of the haptic peripheral. If a relatively low volume below a predetermined threshold is detected, the haptic output device is instructed to play or output a haptic track or effects that are optimized for the device speakers with a low volume audio output as shown in step 964. If a relatively high volume above the predetermined threshold is detected, the haptic output device is instructed to play or output a haptic track or effects that are optimized for the device speakers with a high volume audio output as shown in step 966. Stated another way, if headphones or a Bluetooth device are connected to the audio display (and thus audio will be output via the connected audio accessory device), the haptic output device generates and applies a first haptic effect at step 956. However, if no audio accessory devices are connected to the audio display (and thus audio will be output via an integral speaker of the audio display), the haptic output device generates and applies a second haptic effect at step 964 or a third haptic effect at step 966, depending upon the detected volume level of the audio output.

Figure 10:
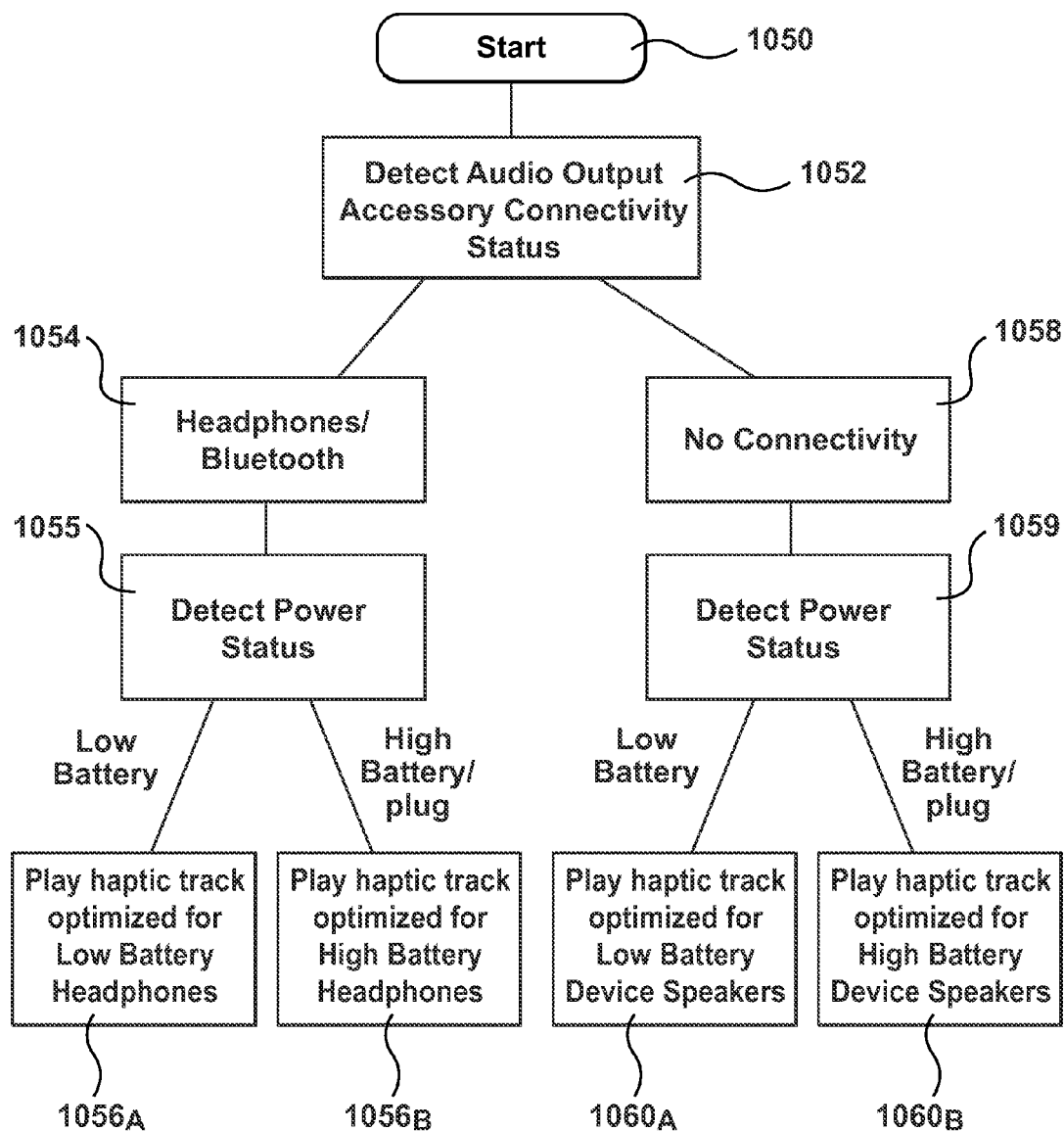
FIG. 10 is a flow chart illustrating a method for providing haptic effects to a user of a haptic peripheral according to an embodiment hereof, wherein the rendered haptic effects vary depending upon an audio output accessory connectivity status of an audio display and upon a detected setting of the audio display, the detected setting being a power status.

FIG. 10 is a flow chart illustrating a method for providing haptic effects to a user of a haptic peripheral according to an embodiment hereof, wherein the rendered haptic effects vary depending upon an audio output accessory connectivity status of the audio display and upon a detected power status of the haptic peripheral. In this embodiment, an audio display of the system includes at least an integral speaker and a headphone connector configured to receive headphones therein. The audio display may be integrated into the host computer, the haptic peripheral, or a secondary peripheral such as the visual display. In an embodiment hereof, the method of FIG. 10 is performed by a gaming tablet having the haptic output device and the audio display integrated into the gaming tablet itself as a single device. In another embodiment hereof, the method of FIG. 10 is performed by a haptic peripheral having the audio display integrated therein such as but not limited to a mobile cell phone device. However, it will be understood by one of ordinary skill in the art that the method of FIG. 10 may be performed by haptic peripheral 102, haptic peripheral 302, haptic peripheral 602, or a haptic peripheral having another configuration as known in the video gaming art. Step 1050 indicates the start or beginning of the method. In an embodiment, the functionality of the flow diagram of FIG. 10 is implemented by software stored in the host memory of the host component and executed by the host processor, and/or the local memory of the haptic peripheral and executed by the local processor. In other embodiments, the functionality may be performed by hardware through the use of an application specific integrated circuit ("ASIC"), a programmable gate array ("PGA"), a field programmable gate array ("FPGA"), or any combination of hardware and software.

In step 1052, an audio output accessory connectivity status of the audio display is detected. If an audio output accessory is not connected to the audio display, an integral speaker of the audio display is utilized for outputting audio or sound. As described above with respect to FIG. 8, the audio output accessory connectivity status of the audio display may be detected in one of several ways such as via connectivity sensor 116 or the host processor and/or the local processor is configured to detect the audio output accessory connectivity status of the audio display without the use of connectivity sensor 116.

Once it is determined whether the audio display is connected to an audio output accessory, the host processor and/or the local processor is configured to vary the control signal for the haptic output device depending on the audio output accessory connectivity status of the audio display and the power status of the haptic peripheral. If the audio display is connected to headphones or a Bluetooth device as shown in step 1054, a power status of the haptic peripheral is detected at step 1055. In an embodiment hereof, the host processor and/or the local processor is configured to detect the power status of the haptic peripheral. If a relatively low battery level below a predetermined threshold is detected, the haptic output device is instructed to play or output a haptic track or effects that are optimized for headphones or a Bluetooth device and a low battery status as shown in step 1056A. If a relatively high battery status above the predetermined threshold or a plugged-in status is detected, the haptic output device is instructed to play or output a haptic track or effects that are optimized for headphones or a Bluetooth device as shown in step 1056B.

If the audio display is not connected to an audio output accessory (i.e., if the audio display is not connected to headphones or a Bluetooth device) as shown in step 1058, a power status of the haptic peripheral is detected at step 1059. In an embodiment hereof, the host processor and/or the local processor is configured to detect the power status of the haptic peripheral. If a relatively low battery level below a predetermined threshold is detected, the haptic output device is instructed to play or output a haptic track or effects that are optimized for device speakers and a low battery status as shown in step 1060A. If a relatively high battery status above the predetermined threshold or a plugged-in status is detected, the haptic output device is instructed to play or output a haptic track or effects that are optimized for device speakers as shown in step 1060B.

As described above with respect to FIG. 8, varying the control signal for the haptic output device may include outputting or selecting a track of haptic effects according to the detected connectivity status and the detected device setting of the audio display or may include modifying or changing the haptic effects of a track according to the detected connectivity status and the detected device setting of the audio display. Stated another way, depending on the detected connectivity status and the detected device setting of the audio display, the host processor and/or the local processor may be configured to adjust the haptic effects of a predetermined haptic track or may be configured to select which haptic track is to be played or output.

In another embodiment hereof, the rendered haptic effects may vary depending upon a predetermined attribute of the haptic peripheral as well as upon the audio output accessory connectivity status of the audio display. In an embodiment hereof, the predetermined attribute is related to interference between haptic and audio outputs of the haptic peripheral. For example, the predetermined attribute may relate to characteristics or capabilities of the integral device speakers (i.e., known issues presented by audio interference with a specific model or haptic peripheral) or characteristics of the haptic peripheral device such as materiality and/or location of the integral device speakers. As an example, a particular haptic peripheral may be known to have a lot of interference between haptic and audio outputs when audio is output via the integral device speakers. In addition, the predetermined attribute of the haptic peripheral may relate to characteristics of certain haptic effects or tracks. As another example, the predetermined attribute of the haptic peripheral may be the frequency range of the haptic actuator as compared to the frequency range of the integral speaker of the audio display. For example, an integral speaker such as a subwoofer may emit only a relatively low frequency. If the relatively low frequency is the only portion or source of audio-haptic interference, the host processor and/or the local processor may be configured to increase the volume of the audio while decreasing and/or removing the haptic effects at the particular relatively low frequency.

Figure 11:
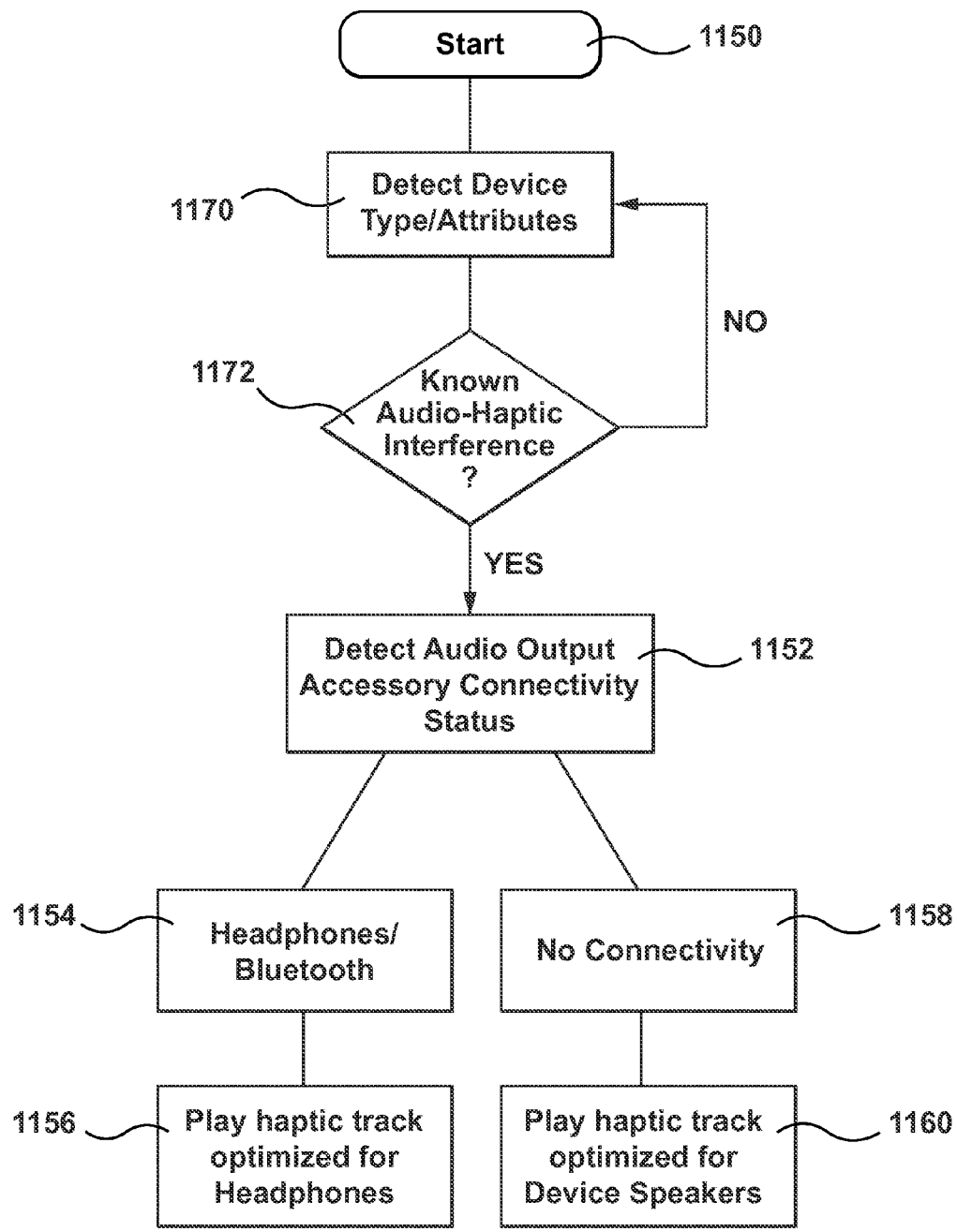
FIG. 11 is a flow chart illustrating a method for providing haptic effects to a user of a haptic peripheral according to an embodiment hereof, wherein the rendered haptic effects vary depending upon an audio output accessory connectivity status of an audio display and upon a predetermined attribute of the haptic peripheral, the predetermined attribute being related to interference between haptic and audio outputs.

FIG. 11 is a flow chart illustrating a method for providing haptic effects to a user of a haptic peripheral according to an embodiment hereof, wherein the rendered haptic effects vary depending upon an audio output accessory connectivity status of the audio display and upon a predetermined attribute of the haptic peripheral, the predetermined attribute being related to interference between haptic and audio outputs of the haptic peripheral. More particularly, in the embodiment of FIG. 11, the audio output accessory connectivity status of the audio display is detected only if the predetermined attribute of the haptic peripheral is associated with known audio interference issues. Step 1150 indicates the start or beginning of the method. In an embodiment, the functionality of the flow diagram of FIG. 11 is implemented by software stored in the host memory of the host component and executed by the host processor, and/or the local memory of the haptic peripheral and executed by the local processor. In other embodiments, the functionality may be performed by hardware through the use of an application specific integrated circuit ("ASIC"), a programmable gate array ("PGA"), a field programmable gate array ("FPGA"), or any combination of hardware and software. In this embodiment, an audio display of the system includes at least an integral speaker and a headphone connector configured to receive headphones therein. The audio display may be integrated into the host computer, the haptic peripheral, or a secondary peripheral such as the visual display. It will be understood by one of ordinary skill in the art that the method of FIG. 11 may be performed by haptic peripheral 102, haptic peripheral 302, haptic peripheral 602, or a haptic peripheral having another configuration as known in the video gaming art.

In step 1170, a predetermined attribute of the haptic peripheral is detected. As described above, in an embodiment hereof, the predetermined attribute is related to interference between haptic and audio outputs of the haptic peripheral. For example, a particular haptic peripheral may be known to have a lot of interference between haptic and audio outputs and thus detection of the predetermined attribute includes detection of the type (i.e., make or manufacturer) and/or model of the haptic peripheral. In step 1172, the host processor and/or the local processor determines whether the detected predetermined attribute is associated with a known audio-haptic interference issue. For example, the host processor accesses a pre-defined mapping of predetermined attributes and associated audio-haptic interference issues.

If the detected predetermined attribute is associated with a known audio-haptic interference issue, an audio output accessory connectivity status of the audio display is detected in step 1152. If an audio output accessory is not connected to the audio display, an integral speaker of the audio display is utilized for outputting audio or sound. As described above with respect to FIG. 8, the audio output accessory connectivity status of the audio display may be detected in one of several ways such as via connectivity sensor 116 or the host processor and/or the local processor is configured to detect the audio output accessory connectivity status of the audio display without the use of connectivity sensor 116.

Once it is determined whether the audio display is connected to an audio output accessory, the host processor and/or the local processor is configured to vary the control signal for the haptic output device depending on the audio output accessory connectivity status of the audio display and the detected predetermined attribute. If the audio display is connected to headphones or a Bluetooth device as shown in step 1154, the haptic output device is instructed to play or output a haptic track or effects that are optimized for headphones or a Bluetooth device as shown in step 1156. If the audio display is not connected to an audio output accessory (i.e., if the audio display is not connected to headphones or a Bluetooth device) as shown in step 1158, the haptic output device is instructed to play or output a haptic track or effects that are optimized for the device speakers as shown in step 1160. Stated another way, if headphones or a Bluetooth device are connected to the audio display (and thus audio will be output via the connected audio accessory device), the haptic output device generates and applies a first haptic effect at step 1156. However, if no audio accessory devices are connected to the audio display (and thus audio will be output via an integral speaker of the audio display), the haptic output device generates and applies a second haptic effect at step 1160.

Embodiments described above include detection of the audio output accessory connectivity status of the audio display as a status indicator associated with possible audio-haptic interference. However, as an alternative or in addition to the connectivity status, other parameters may be detected or sensed as a status indicator associated with possible audio-haptic interference. For example, in an embodiment, a biometric sensor may be utilized as a status indicator associated with possible audio-haptic interference and haptic effects may be varied depending upon detection of adrenaline. When a user is undergoing a rigorous activity, the host processor and/or the local processor is configured vary the control signal for the haptic output device depending on a sensed signal from the biometric sensor (i.e., haptic effects may be strengthened or added when adrenaline is sensed). Similarly, in an embodiment, a motion sensor may be utilized as a status indicator associated with possible audio-haptic interference and haptic effects may be varied depending upon detection of user movement. When a user is working out or undergoing increased activity or movement, the host processor and/or the local processor is configured vary the control signal for the haptic output device depending on a sensed signal from the motion sensor (i.e., haptic effects may be strengthened or added when user is moving or the movement of the user increases above a predetermined threshold). Examples for motion sensors in this embodiment include but are not limited to video camera devices, webcam devices, sensors that detect the presence of nearby objects without any physical contact, motion sensors, sensors applied to a user's skin that detect muscle movements to determine user's motions, infra-red sensors, ultrasonic sensors, near field transmission, stereo triangulation, coded aperture, interferometry, or any other range imaging sensor, such as devices like the XBOX Kinect. Although described as a single motion sensor, it will be understood by one of ordinary skill in the art that multiple sensors may be utilized simultaneously or in conjunction in order to determine a user's motions. For example, a sensor system may be located within a television, monitor, or Kinect accessory to capture a real-time 3D image of the user in a space using multiple sensors. The sensor system also is configured to identify faces using a webcam, as well as points of interaction with the user such as the hands of the user and with other objects such as the haptic peripherals. The sensor system uses this information to determine user position relative to the system and/or peripherals and to determine the position of the peripherals relative to the user and/or system. Intelligent sensors located in the objects also enable awareness of each other such that sensors within the peripheral (such as gyroscope, accelerometer, etc.) will additionally inform the orientation and location of these peripherals.

In another embodiment, an ambient temperature or noise sensor may be utilized as a status indicator associated with possible audio-haptic interference and haptic effects may be varied depending upon detection of ambient temperature and/or ambient noise in either or both of the haptic and audio domains. When ambient temperature and/or ambient noise is detected, the host processor and/or the local processor is configured vary the control signal for the haptic output device depending on a sensed signal from the ambient sensor (i.e., haptic effects may be strengthened or added when an increase in ambient temperature and/or ambient noise is sensed).

In another embodiment, a physical location sensor or sensor system may be utilized as a status indicator associated with possible audio-haptic interference and haptic effects may be varied depending upon detection of the physical location of the haptic peripheral with reference to the user. More particularly, haptic effects may be varied depending upon where the haptic peripheral is physically located with reference to the user, i.e., in user's pocket, held in hand, attached to user's body or on person. A combination of sensors, i.e., a sensor system, can detect position of phone and be utilized for varying haptic effects. For example, some mobile phones are enabled to know the position of the phone at all times (i.e., Project Tango of Google phones or Lynx mobile phones). The host processor and/or the local processor is configured vary the control signal for the haptic output device depending on a sensed signal from the physical location sensor (i.e., haptic effects may be strengthened or added when the user is holding or touching the haptic peripheral). Similarly, in another embodiment, a haptic peripheral may be a peripheral within a mesh or personal/body network in which multiple peripheral devices are connected to each other. If part of a mesh network, haptic effects may be varied depending upon with which peripheral the user is interacting. For example, if two haptically enabled devices or peripherals are brought close enough together to touch each other, the system may be configured to prioritize haptic effects on one haptically enabled device or peripheral over the other haptically enabled device or peripheral.

Figure 12:
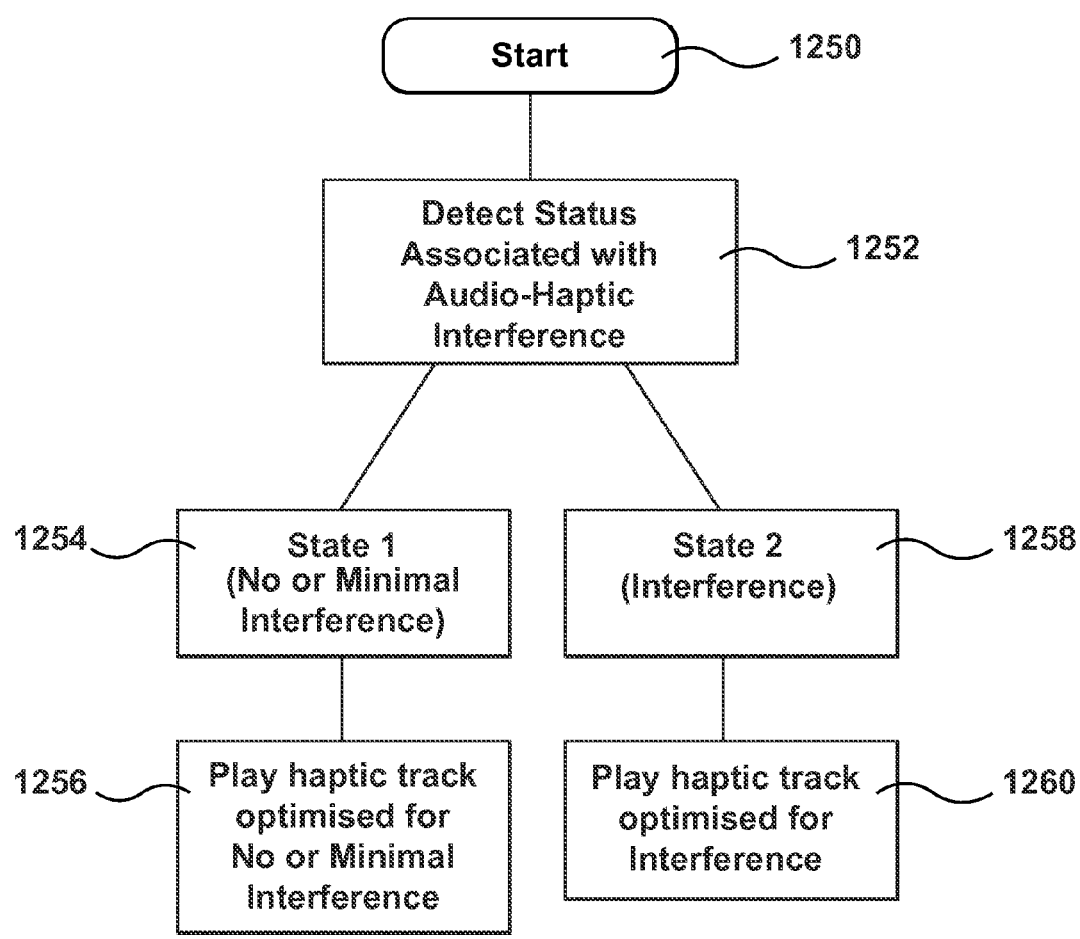
FIG. 12 is a flow chart illustrating a method for providing haptic effects to a user of a haptic peripheral according to an embodiment hereof, wherein the rendered haptic effects vary depending upon a detected status associated with interference between haptic and audio outputs.

FIG. 12 is a flow chart illustrating a method for providing haptic effects to a user of a haptic peripheral according to an embodiment hereof, wherein the rendered haptic effects vary depending upon a detected status associated with interference between haptic and audio output devices. As described above, various parameters may be detected or sensed alone or in any combination as a status indicator associated with possible audio-haptic interference. For example, the detected status may be related to the audio output accessory connectivity status of the audio display, volume level, power status, user biometrics, user movement, ambient temperature, ambient noise, physical location of the haptic peripheral with reference to the user, and/or participation within a mesh network of connected peripherals. Step 1250 indicates the start or beginning of the method. In an embodiment, the functionality of the flow diagram of FIG. 12 is implemented by software stored in the host memory of the host component and executed by the host processor, and/or the local memory of the haptic peripheral and executed by the local processor. In other embodiments, the functionality may be performed by hardware through the use of an application specific integrated circuit ("ASIC"), a programmable gate array ("PGA"), a field programmable gate array ("FPGA"), or any combination of hardware and software. In this embodiment, an audio display of the system includes at least an integral speaker and a headphone connector configured to receive headphones therein. The audio display may be integrated into the host computer, the haptic peripheral, or a secondary peripheral such as the visual display. It will be understood by one of ordinary skill in the art that the method of FIG. 12 may be performed by haptic peripheral 102, haptic peripheral 302, haptic peripheral 602, or a haptic peripheral having another configuration as known in the video gaming art.

In step 1252, a status associated with audio-haptic interference of the haptic peripheral is detected. In certain embodiments hereof, the status associated with audio-haptic interference of the haptic peripheral may be detected via additional parameter sensor 117 (see FIG. 1). Examples for additional parameter sensor 117 in this embodiment include but are not limited to one or more sensors for detecting a status indicator associated with possible audio-haptic interference such as but not limited to the audio output accessory connectivity status of the audio display, volume level, power status, user biometrics, user movement, ambient temperature, ambient noise, physical location of the haptic peripheral with reference to the user, and/or participation within a mesh network of connected peripherals. In other embodiments hereof, the host processor and/or the local processor is configured to detect the status associated with audio-haptic interference of the haptic peripheral without the use of additional parameter sensor 117 (and thus additional parameter sensor 117 is not required in this embodiment).

If the detected status indicates no or minimal audio-haptic interference or a "State 1" as shown in step 1254, the haptic output device is instructed to play or output a haptic track or effects that are optimized for no or minimal audio-haptic interference as shown in step 1256. If the detected status indicates the presence or likelihood of audio-haptic interference or a "State 2" as shown in step 1258, the haptic output device is instructed to play or output a haptic track or effects that are optimized for audio-haptic interference as shown in step 1260. Stated another way, the host processor and/or the local processor is configured to vary the control signal for the haptic output device depending on a detected status of the haptic peripheral associated with interference between haptic and audio outputs such that the haptic output device generates and applies a first haptic effect if the detected status indicates a first state indicative of no or minimal interference between haptic and audio outputs and the haptic output device generates and applies a second haptic effect if the detected status indicates a second state indicative of interference between haptic and audio outputs. In an embodiment, the second haptic effect (rendered if the detected status indicates a second state indicative of interference between haptic and audio outputs) is stronger than the first haptic effect (rendered if the detected status indicates a first state indicative of no or minimal interference between haptic and audio outputs) such that stronger effects are provided when there is interference between haptic and audio outputs of the haptic peripheral.

In an embodiment hereof, the status associated with audio-haptic interference of the haptic peripheral is the haptic actuator's audible level. More particularly, in some devices, a haptic actuator may make or result in an audible buzz or noise when the haptic actuator engages. For example, a user may hear an audible buzz when a haptic peripheral (i.e., a mobile phone device) vibrates. At high intensities, this audible buzz or noise can distract a user from viewing or listening to content on the haptic peripheral. Thus, in an embodiment, the system is configured to detect the haptic actuator's audible level and if the audible level is above a predetermined threshold, the host processor and/or the local processor is configured to adjust the strength, frequency, pattern, or texture of the rendered haptic effects in order to reduce the audible buzz or noise and thus improve the user's overall experience. Conversely, if the detected audible level is below the predetermined threshold, then the rendered haptic effects could be strengthened by the host processor and/or the local processor. In an embodiment hereof in which the haptic peripheral is a peripheral within a mesh or personal/body network in which multiple peripheral devices are connected to each other, haptic and/or audio outputs may be adjusted to reduce a haptic actuator's noise if an audible level of the haptic actuator is above a predetermined threshold. For example, in the context of multiple haptic peripherals, content may be simultaneously played on a primary haptic peripheral and a wearable haptic peripheral and detection of haptic actuator noise on the wearable haptic peripheral would result in adjusting the volume of audio and/or haptic strength to reduce the noise of the wearable haptic peripheral to avoid interference with the content playing on the primary haptic peripheral.

In any embodiment hereof, the host processor and/or the local processor may be alternatively or additionally configured to vary or modify the audio output instead of or in addition to the haptic output. More particularly, the audio display of embodiments hereof is configured to receive a control signal from the host processor and/or the local processor and output audio to the haptic peripheral in response to the control signal from the host processor and/or the local processor. The host processor and/or the local processor may be configured to vary the control signal for the haptic output device and/or the control signal for the audio display depending on a status indicator associated with possible audio-haptic interference such as but not limited to the audio output accessory connectivity status of the audio display, volume level, power status, user biometrics, user movement, ambient temperature, ambient noise, physical location of the haptic peripheral with reference to the user, and/or participation within a mesh network of connected peripherals. For example, in addition to or instead of varying or adjusting the magnitude (or selecting a specially authored track) for haptic effects to compensate for the vibration output by the speaker, the audio track may be modified to enhance the rendered haptic effects when the detected status indicates a state indicative of interference between haptic and audio outputs. For example, the speaker intensity or volume may be modulated to enhance haptic effects when the detected status indicates a state indicative of interference between haptic and audio outputs. As another example, if a particular haptic effect or sequence results in some known quantity of audio interference, the volume of the audio effects are adjusted for the duration of the haptic effect or sequence to ensure the user can both hear the audio feedback and feel the haptic feedback as the designer intended.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. Stated another way, aspects of the above methods of rendering haptic effects may be used in any combination with other methods described herein or the methods can be used separately. All patents and publications discussed herein are incorporated by reference herein in their entirety.

What is claimed is:

1. A system comprising:
a processor;
an audio display including an audio output device;
a haptic peripheral including a haptic output device, wherein the haptic output device is configured to receive a control signal from the processor and to output a haptic effect to the haptic peripheral in response to the control signal from the processor, and
wherein the processor is configured to vary the control signal for the haptic output device depending on a detected status associated with interference between the haptic output device and the audio output device, the detected status being a sensed signal that indicates an activity level of a user via a biometric sensor or a motion sensor, and wherein the haptic output device generates and applies a first haptic effect when the detected status indicates a first state indicative of no or minimal interference between the haptic output device and the audio output device and the haptic output device generates and applies a second haptic effect when the detected status indicates a second state indicative of interference between the haptic output device and the audio output device, the second haptic effect being stronger than the first haptic effect.

2. The system of claim 1, wherein the processor is configured to detect the detected status.

3. The system of claim 1, wherein the system further includes the biometric sensor, the biometric sensor being configured to detect adrenaline of a user, and wherein the sensed signal is from the biometric sensor, the second state indicative of interference between the haptic output device and the audio output device including a detection of adrenaline above a predetermined threshold.

4. The system of claim 1, wherein the system further includes the motion sensor, the motion sensor being configured to detect movement of a user, and wherein the sensed signal is from the motion sensor, the second state indicative of interference between the haptic output device and the audio output device including a detection of movement above a predetermined threshold.

5. The system of claim 1, wherein the processor is configured to vary a control signal for the audio display depending on the detected status.

6. The system of claim 1, wherein system further includes a host computer and the processor is disposed in the host computer.

7. The system of claim 1, wherein the processor is disposed in the haptic peripheral.

8. A system comprising:
a processor;
an audio display including a speaker and a headphone connector;
a haptic peripheral including a haptic output device, wherein the haptic output device is configured to receive a control signal from the processor and to output a haptic effect to the haptic peripheral in response to the control signal from the processor, and
wherein the processor is configured to vary the control signal for the haptic output device depending on a detected status associated with interference between the haptic output device and the audio display, the detected status being an audio output accessory connectivity status of the audio display such that the haptic output device generates and applies a first haptic effect when the detected status indicates a first state indicative of no or minimal interference between the haptic output device and the audio display, the first state being when the audio display is connected to an audio output accessory in order to output audio through the headphone connector and the haptic output device generates and applies a second haptic effect when the detected status indicates a second state indicative of interference between the haptic output device and the audio display, the second state being when the audio display is not connected to an audio output accessory in order to output audio through the speaker, the first haptic effect being stronger than the second haptic effect.

9. The system of claim 8, wherein the processor is configured to detect a power status of the audio display and is also configured to vary the control signal for the haptic output device depending on the detected power status in addition to varying the control signal for the haptic output device depending on the audio output accessory connectivity status of the audio display.

10. The system of claim 8, wherein the processor is configured to detect a predetermined attribute of the haptic peripheral or the audio display and is also configured to vary the control signal for the haptic output device depending on the detected predetermined attribute in addition to varying the control signal for the haptic output device depending on the audio output accessory connectivity status of the audio display, the predetermined attribute being associated with a known audio-haptic interference issue.

11. The system of claim 8, wherein the processor is configured to detect the audio output accessory connectivity status of the audio display.

12. The system of claim 8, wherein the processor is configured to detect a volume level of the audio display when the audio display is not connected to an audio output accessory and is also configured to vary the control signal for the haptic output device depending on the detected volume level in addition to varying the control signal for the haptic output device depending on the audio output accessory connectivity status of the audio display.

13. A system comprising:
   a processor;
   an audio display, the audio display being configured to receive a control signal from the processor and to output audio in response to the control signal from the processor; and
   a haptic peripheral including a haptic output device, the haptic output device being configured to receive a control signal from the processor and to output a haptic effect to the haptic peripheral in response to the control signal from the processor;
   wherein the processor is configured to detect a predetermined attribute of the haptic peripheral or the audio display, the predetermined attribute being related to a known audio-haptic interference issue between the haptic output device and the audio display; and
   wherein the processor is configured to vary the control signal for the haptic output device depending on the detected predetermined attribute in addition to an audio output accessory connectivity status of the audio display such that the haptic output device generates and applies a first haptic effect when the detected predetermined attribute is associated with the known audio-haptic interference issue and the audio display is connected to an audio output accessory, and the haptic output device generates and applies a second haptic effect when the detected predetermined attribute is associated with the known audio-haptic interference issue and the audio display is not connected to an audio output accessory.

14. The system of claim 13, wherein the first haptic effect is stronger than the second haptic effect.

15. The system of claim 13, wherein the processor is configured to detect the audio output accessory connectivity status of the audio display.

16. The system of claim 13, wherein the predetermined attribute includes a characteristic or a location of a speaker of the audio display.

17. The system of claim 16, wherein the predetermined attribute includes a frequency range of the speaker of the audio display.

18. The system of claim 13, wherein the predetermined attribute includes a frequency range of the haptic output device.

19. The system of claim 13, wherein the processor is configured to detect a volume level of the audio display and is also configured to vary the control signal for the haptic output device depending on the detected volume level in addition to varying the control signal for the haptic output device depending on the audio output accessory connectivity status of the audio display.

20. The system of claim 13, wherein the processor is configured to detect a power status of the audio display and is also configured to vary the control signal for the haptic output device depending on the detected power status in addition to varying the control signal for the haptic output device depending on the audio output accessory connectivity status of the audio display.

* * * * *